(No Model.)
E. E. LEACH.
HEATING ATTACHMENT FOR LAMPS.
No. 327,278. Patented Sept. 29, 1885.
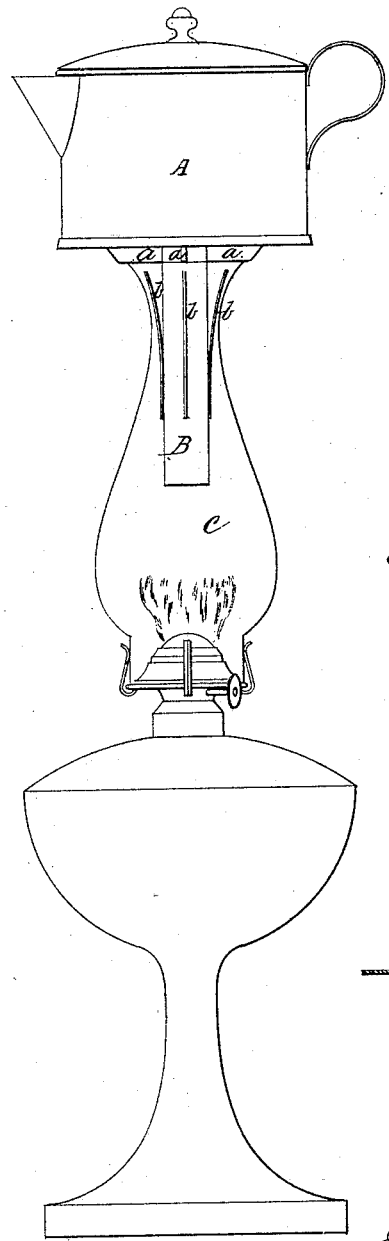
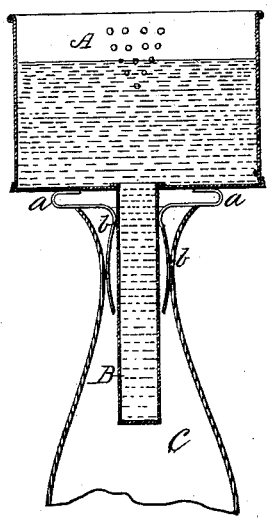
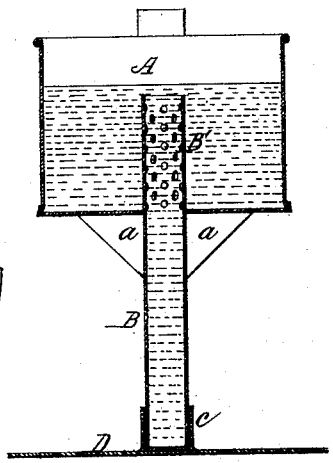

UNITED STATES PATENT OFFICE.

EDWIN E. LEACH, OF CEDAR RAPIDS, IOWA.

HEATING ATTACHMENT FOR LAMPS.

SPECIFICATION forming part of Letters Patent No. 327,278, dated September 29, 1885.

Application filed November 22, 1884. (No model.)

*To all whom it may concern:*

Be it known that I, EDWIN E. LEACH, a citizen of the United States, residing at Cedar Rapids, in the county of Linn and State of Iowa, have invented certain new and useful Improvements in Heating Attachments for Lamps, of which the following is a specification.

The object of this invention is to facilitate the boiling of liquids and cooking of small articles over a common kerosene-lamp by increasing the heating-surface of the cooking-vessel as compared with others for this purpose, and bringing the contents of such vessel nearer to the flame of the lamp.

The invention consists in a vessel adapted to rest upon the top of a lamp-chimney without interfering with combustion, and having a tube communicating with the interior, extending downward from the bottom of such vessel and inside the lamp-chimney, whereby the contents of the vessel and tube are subjected to the greatest possible amount of heat. It further consists in means for keeping the body of the vessel slightly above the chimney, and the tube central therewith, and for supporting the vessel when not in use.

In the accompanying drawings, forming a part of this specification, Figure 1 represents an elevation of the invention as applied to a lamp; Fig. 2, a vertical cross-section thereof with a modified spring and support; and Fig. 3 a vertical cross section of the same, showing a modified tube and support and a base.

Similar letters of reference indicate corresponding parts.

Various devices have been produced for utilizing the heat of a kerosene-lamp for culinary or analogous purposes; but in all with which I am familiar the vessel either rests entirely above or partially surrounds the chimney. My improvements consist, chiefly, in extending a portion of the vessel downward near the flame inside the chimney, and thus bringing its contents into close proximity to the greatest heat, as well as greatly increasing the heating-surface of the vessel. To this end the vessel A is provided with a tube, B, communicating therewith and extending from the bottom thereof, as shown. The tube is made somewhat smaller than the neck of the chimney C, so as not to obstruct the passage of air-currents, and may extend to within a short distance from the flame when in position. Ordinarily, it may terminate in the bottom of the vessel, as in Fig. 2; but to prevent any obstruction of it by solid matter the tube may project above the bottom, as in Fig. 3, the free circulation of liquids being provided for by the perforations therein. The result of this arrangement is greatly to increase the heating capacity of the vessel, and hasten the preparation of tea, milk, and other liquids, the cooking of eggs, &c., without increasing the combustion of the lamp or diminishing its illuminating capacity. On the contrary, the wick must be turned down somewhat before the tube is introduced into the chimney, the presence of which causes the flame to rise without any apparent decrease of light or heat.

To allow the air to pass out at the top of the chimney, the vessel is supported slightly above it on feet *a a a*. These may be simple metallic strips fastened to the bottom of the vessel, or may constitute a part of the springs *b b*, which serve to keep the tube in the center of the chimney, as shown in Fig. 2. By beveling these feet, as in Fig. 3, the spring may be dispensed with, though I do not regard this as desirable, on account of the tendency it would have to split the chimney. It will be evident, however, that the device shown in Fig. 1 may be used without springs, but for greater convenience and accuracy of adjustment they are desirable. Their form may vary considerably, as indicated, and they may be attached to the tube, as in Fig. 1, or to the bottom of the vessel, as in Fig. 2. Two or more may be used, the number being governed by the requirements of the case. The device is also provided with a base, D, upon which it is supported in an upright position when removed from the lamp.

The base may be a simple disk with a raised socket, *c*, in which the end of the tube is set, as in Fig. 3.

Having thus briefly described my invention, what I claim as new, and desire to secure by Letters Patent, is—

1. In a heating attachment for a lamp, the combination of vessel A, tube B, and supporting-feet *a a a*, substantially as specified.

2. In a heating attachment for a lamp, the combination of vessel A, tube B, feet a a a, and springs b b, substantially as described.

3. As a new article of manufacture, a heating attachment for a lamp, consisting in a vessel, A, having a downwardly-extending tube, B, supporting-feet a a a, and centering-springs b b, and an independent supporting-base, D, substantially as described.

In testimony whereof I affix my signature in presence of two witnesses.

EDWIN E. LEACH.

Witnesses:
   L. T. WILCOX,
   G. L. BENNETT.